United States Patent
Wang

(10) Patent No.: US 10,388,241 B2
(45) Date of Patent: Aug. 20, 2019

(54) PIXEL CHARGING METHOD AND CIRCUIT, LCD PANEL, AND LCD DEVICE

(71) Applicants: HKC Corporation Limited, Shenzhen (CN); Chongqing HKC Optoelectronics Technology Co., Ltd., Chongqing (CN)

(72) Inventor: Mingliang Wang, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 42 days.

(21) Appl. No.: 15/562,345

(22) PCT Filed: Jun. 20, 2017

(86) PCT No.: PCT/CN2017/089086
§ 371 (c)(1),
(2) Date: Sep. 27, 2017

(87) PCT Pub. No.: WO2018/120676
PCT Pub. Date: Jul. 5, 2018

(65) Prior Publication Data
US 2018/0357972 A1    Dec. 13, 2018

(30) Foreign Application Priority Data

Dec. 29, 2016 (CN) .......................... 2016 1 1248443

(51) Int. Cl.
G09G 3/36 (2006.01)
G02F 1/1362 (2006.01)
G02F 1/1368 (2006.01)

(52) U.S. Cl.
CPC ..... *G09G 3/3677* (2013.01); *G02F 1/136286* (2013.01); *G09G 3/3611* (2013.01); *G09G 3/3648* (2013.01); *G09G 3/3688* (2013.01); *G02F 1/1368* (2013.01); *G09G 2310/0251* (2013.01); *G09G 2310/08* (2013.01)

(58) Field of Classification Search
CPC ................... G09G 2310/0243–0259
See application file for complete search history.

(56) References Cited

U.S. PATENT DOCUMENTS

| | | | | |
|---|---|---|---|---|
| 9,721,510 B2* | 8/2017 | Xu | .......... | G11C 19/28 |
| 9,928,796 B2* | 3/2018 | Nakatani | .............. | G09G 3/3677 |
| 2008/0088568 A1* | 4/2008 | Haga | ...................... | G09G 3/18 |
| | | | | 345/100 |
| 2013/0215160 A1* | 8/2013 | Pyun | .................... | G09G 3/3655 |
| | | | | 345/691 |

(Continued)

*Primary Examiner* — Gene W Lee
(74) *Attorney, Agent, or Firm* — Wang Law Firm, Inc.

(57) ABSTRACT

A pixel charging method and circuit, an LCD panel and an LCD device, wherein two driving signals drive two adjacent row scan lines to charge the pixel. When the pixel of a row is charged, the pixel of the next row is pre-charged, and there is no angle cutting in a certain period before and after the pre-charge is completed, so that after the pre-charge of the pixel is completed and the charging of the pixel starts, the active switch of the pixel is turned on completely without affecting the actual charging process, in order to improve the effect of charging the pixel.

17 Claims, 7 Drawing Sheets

(56) References Cited

U.S. PATENT DOCUMENTS

| | | | |
|---|---|---|---|
| 2014/0203854 A1* | 7/2014 | Jung | H03L 7/0802 |
| | | | 327/158 |
| 2014/0219412 A1* | 8/2014 | Chien | G11C 19/28 |
| | | | 377/68 |
| 2017/0285375 A1* | 10/2017 | Iwase | G02F 1/133 |
| 2018/0114501 A1* | 4/2018 | Fu | G09G 3/3648 |

* cited by examiner

PIXEL CHARGING METHOD AND CIRCUIT, LCD PANEL, AND LCD DEVICE

CROSS-REFERENCE TO RELATED APPLICATION

This application claims priority from CN Application No. 201611248443.8 filed on Dec. 29, 2016, in SIPO, the content of which is hereby incorporated by reference in their entirety for all purposes.

FIELD OF INVENTION

The present invention relates to the field of liquid crystal displays (LCDs), in particular to a pixel charging method and circuit, an LCD panel and an LCD device.

BACKGROUND OF INVENTION

1. Description of the Related Art

At present, some high frame rate televisions (over 120 Hz) or televisions with a tri-gate structure (or a tri-gate driving circuit) usually have the issue of insufficient charging, since the tri-gate scan frequency is too high, and the time of turning on a thin film transistor (TFT) is reduced. In general, pre-charging is a common measure taken to overcome the insufficient charge issue. In other words, the voltage of the $N^{th}$ row is charged to the voltage of the $(N+1)^{th}$ row, and then a correct voltage is charged to the $(N+1)^{th}$ row. To reduce the capacitive coupling effect produced when turning off the switch of the thin film transistor (TFT), the falling edge of the gate driving voltage VGH signal of the TFT is cut at an angle. However, the angle cutting process will reduce the scan potential in the waveform of the voltage of the scan line when the pixels are pre-charged, and thus the electrical conduction of TFT is too low in the charging process, so as to affect the pixel charging effect and reduce the pre-charging effect.

2. Summary of the Invention

Therefore, it is a primary objective of the present invention to overcome the drawbacks of the prior art by providing a pixel charging method and circuit capable of improving the pixel charging effect.

To achieve the aforementioned and other objectives, the present invention provides a pixel charging method comprising the steps of: outputting a first driving signal to turn on an active switch of the $N^{th}$ row scan line to pre-charge and charge an $N^{th}$ row of pixels, wherein the first driving signal has no angle cutting in a predetermined first time period, and the predetermined first time period includes a period of time before and after the pre-charge of the $N^{th}$ row of pixels is completed, and the first driving signal has an angle cutting in a predetermined second time period, and the predetermined second time period includes a period of time before the charge of the $N^{th}$ row of pixels is completed, and N is a natural number; and outputting a second driving signal to turn on a switch of the $(N+1)^{th}$ row scan line to pre-charge and charge the $(N+1)^{th}$ row of pixels, wherein the second driving signal has no angle cutting in a predetermined third time period, and the predetermined third time period includes a period of time before and after the pre-charge of the $(N+1)^{th}$ row of pixels is completed, and the second driving signal has an angle cutting in a predetermined fourth time period, and the predetermined fourth time period includes a period of time before the charge of the $(N+1)^{th}$ row of pixels is completed, and the difference between the time point of completing the charge of the $N^{th}$ row of pixels and the time point of outputting the second driving signal is positive and equal to or smaller than the pre-charging time of the $(N+1)^{th}$ row of pixels.

To achieve the aforementioned and other objectives, the present invention further provides a pixel charging circuit comprising: a scan driving circuit, for outputting a first driving signal to turn on an active switch of the $N^{th}$ row scan line, and outputting a second driving signal to turn on a switch of the $(N+1)^{th}$ row scan line; a data driving circuit, for pre-charging and charging the $N^{th}$ row of pixels when the first driving signal is outputted, and pre-charging and charging the $(N+1)^{th}$ row of pixels when the second driving signal is outputted; wherein the first driving signal has no angle cutting in a predetermined first time period, and the predetermined first time period includes a period of time before and after the pre-charge of the $N^{th}$ row of pixels is completed, and the first driving signal has an angle cutting in a predetermined second time period, and the predetermined second time period includes a period of time before the charge of the $N^{th}$ row of pixels is completed, and N is a natural number; the second driving signal has no angle cutting in a predetermined third time period, and the predetermined third time period includes a period of time before and after the pre-charge of the $(N+1)^{th}$ row of pixels is completed, and the second driving signal has an angle cutting in a predetermined fourth time period, and the predetermined fourth time period includes a period of time before the charge of the $(N+1)^{th}$ row of pixels is completed, and the difference between the time point of completing the charge of the $N^{th}$ row of pixels and the time point of outputting the second driving signal is positive and equal to or smaller than the pre-charging time of the $(N+1)^{th}$ row of pixels.

To achieve the aforementioned and other objectives, the present invention further provides an LCD panel including the pixel charging circuit, and the pixel charging circuit comprises: a scan driving circuit, for outputting a first driving signal to turn on an active switch of the $N^{th}$ row scan line, and outputting a second driving signal to turn on a switch of the $(N+1)^{th}$ row scan line; a data driving circuit, for pre-charging and charging the $N^{th}$ row of pixels when the first driving signal is outputted, and pre-charging and charging the $(N+1)^{th}$ row of pixels when the second driving signal is outputted; wherein the first driving signal has no angle cutting in a predetermined first time period, and the predetermined first time period includes a period of time before and after the pre-charge of the $N^{th}$ row of pixels is completed, and the first driving signal has an angle cutting in the predetermined second time period, and the predetermined second time period includes a period of time before the charge of the $N^{th}$ row of pixels is completed, and N is a natural number; the second driving signal has no angle cutting in a predetermined third time period, and the predetermined third time period includes a period of time before and after the pre-charge of the $(N+1)^{th}$ row of pixels is completed, and the second driving signal has an angle of cutting in a predetermined fourth time period, and the predetermined fourth time period includes a period of time before the charge of the $(N+1)^{th}$ row of pixels is completed, and the difference between the time point of completing the charge of the $N^{th}$ row of pixels and the time point of outputting the second driving signal is positive and equal to or smaller than the pre-charging time of the $(N+1)^{th}$ row of pixels.

To achieve the aforementioned and other objectives, the present invention further provides an LCD device including the LCD panel, and the LCD panel includes the pixel charging circuit, and the pixel charging circuit comprises: a scan driving circuit, for outputting a first driving signal to turn on an active switch of the $N^{th}$ row scan line, and outputting a second driving signal to turn on a switch of the $(N+1)^{th}$ row scan line; a data driving circuit, for pre-charging and charging the $N^{th}$ row of pixels when the first driving signal is outputted, and pre-charging and charging the $(N+1)^{th}$ row of pixels when the second driving signal is outputted; wherein the first driving signal has no angle cutting in a predetermined first time period, and the predetermined first time period includes a period of time before and after the pre-charge of the $N^{th}$ row of pixels is completed, and the first driving signal has an angle cutting in a predetermined second time period, and the predetermined second time period includes a period of time before and after the charge of the $N^{th}$ row of pixels is completed, and N is a natural number; the second driving signal has no angle cutting in a predetermined third time period, and the predetermined third time period includes a period of time before and after the pre-charge of the $(N+1)^{th}$ row of pixels is completed, and the second driving signal has an angle cutting in a predetermined fourth time period, and the predetermined fourth time period includes a period of time before the $(N+1)^{th}$ row of pixels is completed, and the difference between the time point of completing the charge of the $N^{th}$ row of pixels and the time point of outputting the second driving signal is positive and equal to or smaller than the pre-charging time of the $(N+1)^{th}$ row of pixels.

In the present invention, two driving signals are used for driving two adjacent scan lines to pre-charge and charge the row of pixels. When the pixel of a row is charged, the pixel of the next row is pre-charged. After the pre-charge of the pixel is completed, the charging of the pixel starts immediately, and there is no angle cutting in a certain period before the pre-charge is completed, so that after the pre-charge of the pixel ends and the charging of the pixel starts, the active switch is turned on completely without affecting the actual charging process, in order to improve the effect of charging the pixel.

BRIEF DESCRIPTION OF THE DRAWINGS

The above and other objects, features and advantages of this disclosure will become apparent from the following detailed description taken with the accompanying drawings. It is noteworthy that the drawings are provided for the purpose of illustrating the invention and other drawings may be obtained without any significant creative effort by a person having ordinary skill in the art.

DESCRIPTION OF THE PREFERRED EMBODIMENTS

It is noteworthy that the embodiments are provided for the purpose of illustrating the present invention, but not intended for limiting the scope of the invention.

It is noteworthy that this specification uses an open-ended term "comprising" meaning that the claim encompasses all the elements listed, but may also include additional unnamed elements.

Figure 1:
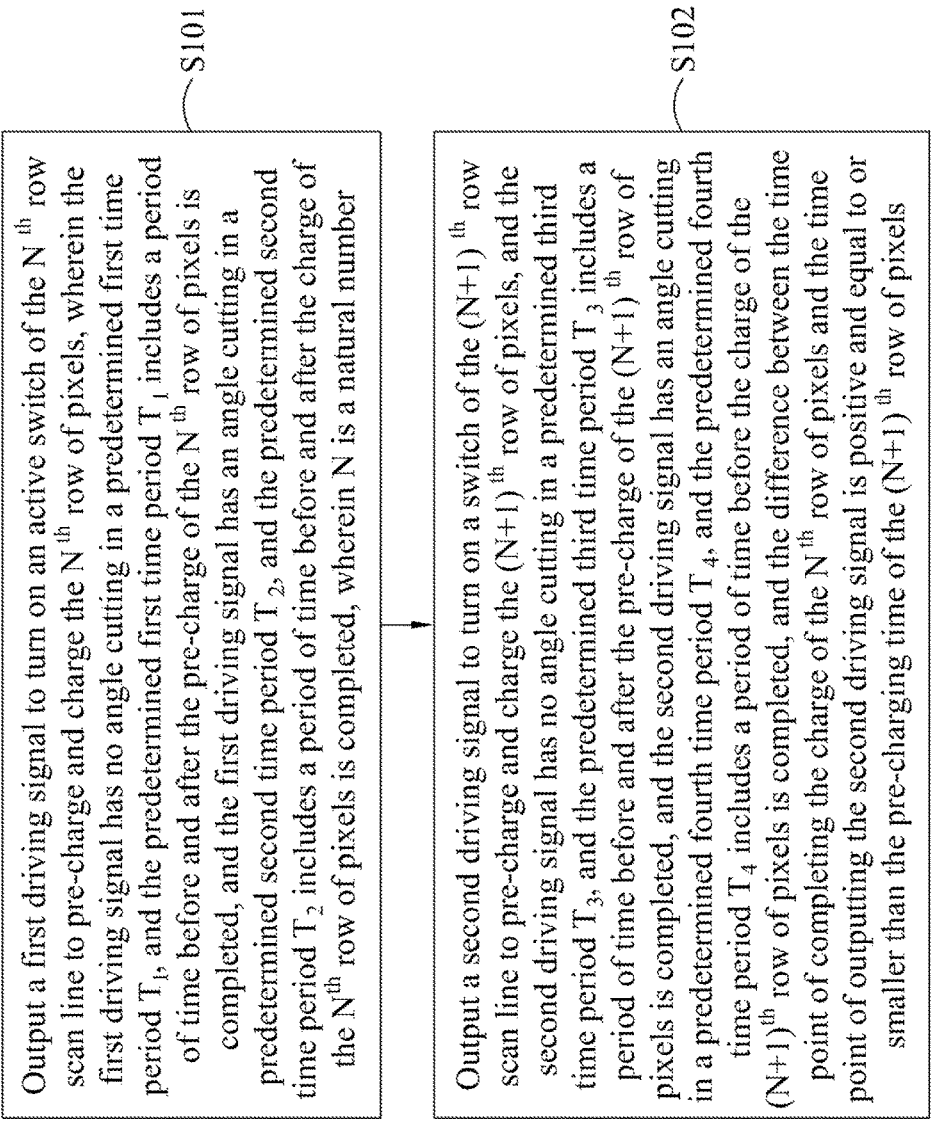
FIG. 1 is a flow chart of a pixel charging method in accordance with a preferred embodiment of the present invention.

With reference to FIG. 1, which is a flow chart of a pixel charging method in accordance with a preferred embodiment of the present invention, the pixel charging method comprises the following steps:

S101: Output a first driving signal to turn on an active switch of the $N^{th}$ row scan line to pre-charge and charge the $N^{th}$ row of pixels, wherein the first driving signal has no angle cutting in a predetermined first time period $T_1$, and the predetermined first time period $T_1$ includes a period of time before and after the pre-charge of the $N^{th}$ row of pixels is completed, and the first driving signal has an angle cutting in a predetermined second time period $T_2$, and the predetermined second time period $T_2$ includes a period of time before and after the charge of the $N^{th}$ row of pixels is completed, wherein N is a natural number.

In a preferred embodiment of the present invention, the scan driving circuit outputs a first driving signal to a scan line to turn on an active switch of the scan line, so that the data driving circuit pre-charges the pixel and the pixel is charged immediately after the pre-charge ends. The first driving signal has no angle cutting in a predetermined first time period $T_1$, and the predetermined first time period $T_1$ includes a period of time before and after the pre-charge of the $N^{th}$ row of pixels is completed, so that a high level can be maintained without affecting the conduction condition of the active switch before and after the pre-charge of the pixels ends, and the active switch is still conducted completely when the actual charge starts, so as to prevent an incomplete conduction of the active switch or a low charging effect and maintain a good pre-charging effect.

S102: Output a second driving signal to turn on a switch of the $(N+1)^{th}$ row scan line to pre-charge and charge the $(N+1)^{th}$ row of pixels, and the second driving signal has no angle cutting in a predetermined third time period $T_3$, and the predetermined third time period $T_3$ includes a period of time before and after the pre-charge of the $(N+1)^{th}$ row of pixels is completed, and the second driving signal has an angle cutting in a predetermined fourth time period $T_4$, and the predetermined fourth time period $T_4$ includes a period of time before the charge of the $(N+1)^{th}$ row of pixels is completed, and the difference between the time point of completing the charge of the $N^{th}$ row of pixels and the time point of outputting the second driving signal is positive and equal to or smaller than the pre-charging time of the $(N+1)^{th}$ row of pixels.

In a preferred embodiment of the present invention, a driving signal for driving two adjacent scan lines is not the same signal outputted by a scan driving circuit to the $(N+1)^{th}$ row scan line before completing the charge of the $N^{th}$ row of pixels to turn on the $(N+1)^{th}$ row, active switch, so that the data driving circuit pre-charges the $(N+1)^{th}$ row of pixels while the $N^{th}$ row of pixels is being charged. Charging a row of pixel while pre-charging the next row of pixel can overcome the insufficient charging problem caused by the too-high scan frequency. After the pre-charge ends, the pixels are charged immediately. Since the second driving signal has no angle cutting when the active switch is turned on within a period of time before and after the pre-charging is completed, and the voltage level is high, so that the active switch is maintained at a completely conducted status, and the effect of charging the pixels can be improved since the actual charging effect will not be affected by the poor conduction of the active switch.

In a preferred embodiment, the first driving signal and the second driving signal are different, and the first driving signal and second driving signal outputted from the scan driving circuit can be generated by an embedded power IC or inputted to the scan driving circuit after the signals are generated by an independent power IC, and then the scan driving circuit drives a start signal and other control signals according to the clock signal to output the first driving signal and second driving signal to two adjacent row scan lines sequentially, and the clock signal controls the output time duration for outputting the first driving signal and second driving signal to the corresponding scan line.

In a preferred embodiment, if a first level signal and a second level signal have insufficient drive capacity, it will be necessary to amplify the first level signal and second level signal to enhance their drive capacity before the scan circuit is driven to output the signals to the scan line.

In a preferred embodiment, the active switch is a thin film transistor (TFT).

In a preferred embodiment, the predetermined first time period $T_1$ is equal to the predetermined third time period $T_3$, and the predetermined second time period $T_2$ is equal to the predetermined fourth time period $T_4$, and the period of time before completing the pre-charge of the pixel is equal to half of the pre-charging time, and the period of time after completing the pre-charge of the pixel is equal to half of the pre-charging time.

The first driving signal and second driving signal has an angle cutting at the same time period of the output, so that the respective active switches have the same conduction condition when two adjacent rows of pixels are pre-charged or charged, so as to avoid non-uniform charge caused by the different conduction conditions and prevent the non-uniform charge.

In a preferred embodiment, the difference between the time point of completing the charge of the $N^{th}$ row of pixels and the time point of outputting the second driving signal is equal to the pre-charging time of the $(N+1)^{th}$ row of pixels. In other words, when the charge of a row of pixels is completed, the pre-charge of the next row of pixels is also completed, and the charge of the next row of pixels starts. Since the voltage of the pre-charge of the next row of pixels is increased up to a target voltage, the distance between the original voltage and the target voltage is reduced, and the issue of insufficient charging can be improved significantly.

In a preferred embodiment, the pre-charging time is equal to the charging time.

Figure 2:
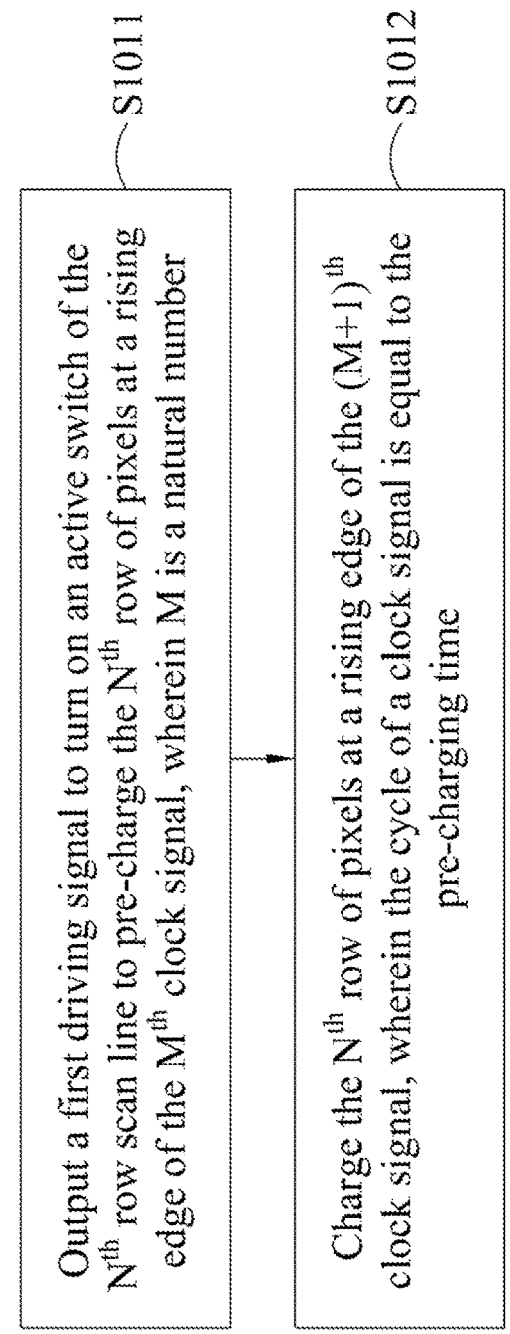
FIG. 2 is a flow chart showing a sub-step of Step 101 of a pixel charging method of a preferred embodiment of the present invention.

S101: Output the first driving signal to turn on an active switch of the $N^{th}$ row scan line to pre-charge and charge the $N^{th}$ row of pixels as shown in FIG. 2, and this step S101 further comprises the steps S1011~S1012:

S1011: Output a first driving signal to turn on an active switch of the $N^{th}$ row scan line to pre-charge the $N^{th}$ row of pixels at a rising edge of the $M^{th}$ clock signal, wherein M is a natural number.

S1012: Charge the $N^{th}$ row of pixels at a rising edge of the $(M+1)^{th}$ clock signal, wherein the cycle of a clock signal is equal to the pre-charging time.

Figure 3:
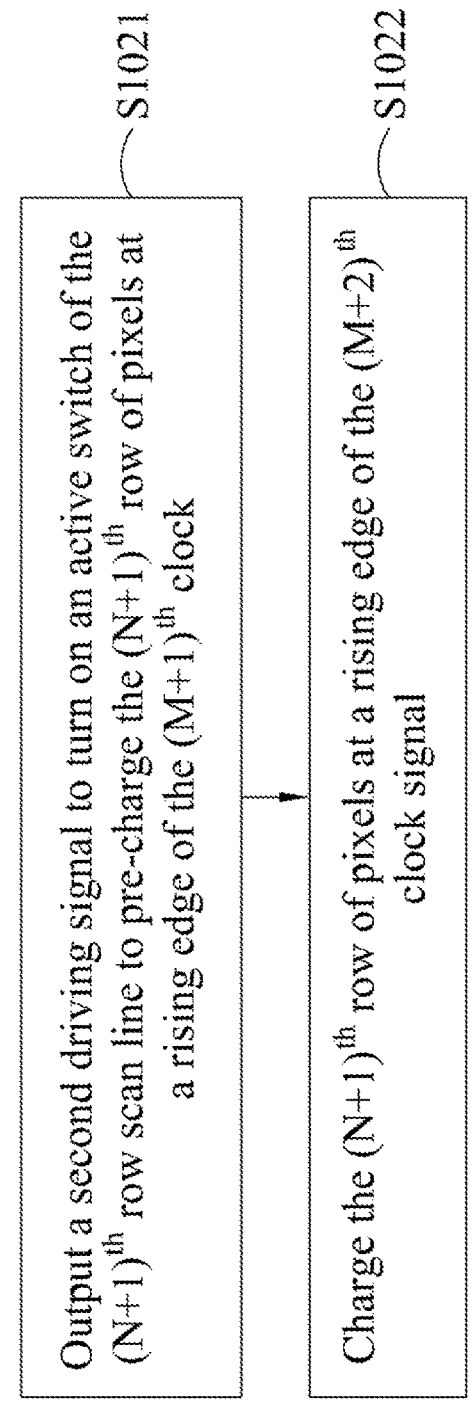
FIG. 3 is a flow chart showing a sub-step of Step 102 of a pixel charging method of a preferred embodiment of the present invention.

Step S102: Output a second driving signal to turn on a switch of the $(N+1)^{th}$ row scan line to pre-charge and charge the $(N+1)^{th}$ row of pixels as shown in FIG. 3, and this step S102 further comprises the steps S1011~S1012:

S1021: Output a second driving signal to turn on an active switch of the $(N+1)^{th}$ row scan line to pre-charge the $(N+1)^{th}$ row of pixels at a rising edge of the $(M+1)^{th}$ clock.

S1022: Charge the $(N+1)^{th}$ row of pixels at a rising edge of the $(M+2)^{th}$ clock signal.

In general, M=N.

Figure 4:
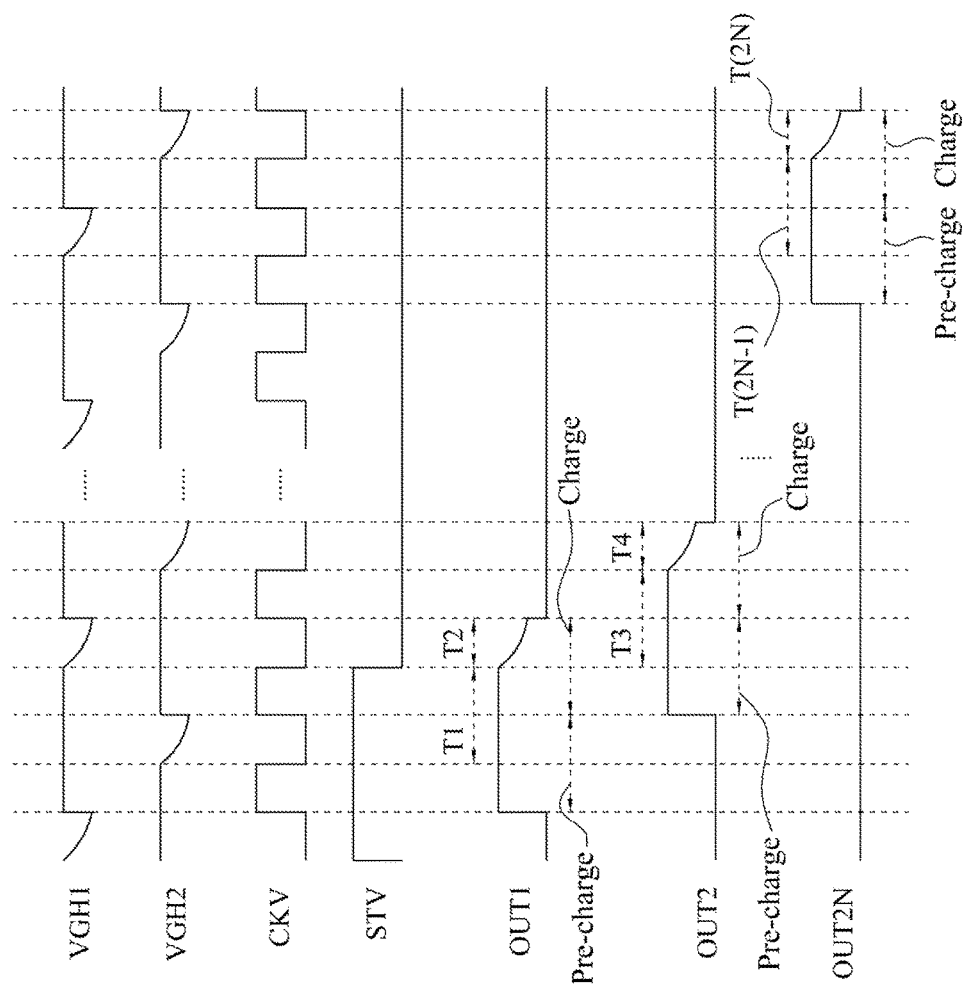
FIG. 4 is a waveform chart of driving signals of a scan line in accordance with a preferred embodiment of the present invention.

With reference to FIG. 4, which is a waveform chart of driving signals of a scan line in accordance with a preferred embodiment of the present invention, $VGH_1$ is the original waveform chart of a first driving signal; $VGH_2$ is the original waveform chart of a second driving signal; CKV is a waveform chart of a clock signal; STV is a waveform chart of a drive starting signal, and $OUT_1$ and $OUT_2$ are the output statuses of the first driving signal and second driving signal respectively. FIG. 4 shows that $T_1=T_3=T_{(2N-1)}$, and $T_2=T_4=T_{(2N)}$.

The first row and second row scan lines are used as examples, and the first driving signal is outputted to the first row scan line at a rising edge of the first clock signal, and the output time is the time duration of continuously driving a time pulse width of the start signal. In other words, the output of the first driving signal is completed at a rising edge of the third clock signal, and the waveform chart of $OUT_1$ as shown in FIG. 3 is obtained. In other words, the status of the first driving signal outputted to the $N^{th}$ row scan line is obtained. When the first driving signal is outputted, the active switch of the first row scan line is turned on to pre-charge the first row of pixels, and pre-charging time is equal to a cycle of the clock signal, and the first row of pixels is charged at a rising edge of the second clock signal, and the charging time is equal to a cycle of the clock signal. Meanwhile, a second driving signal is outputted to the second row scan line to turn on a switch of the second row scan line to pre-charge the second row of pixels at a rising edge of the second clock signal, so as to charge the first row of pixels up to the voltage of the second row, and reduce the difference between the original voltage of the second row of pixels and a target voltage. When the charge of the first row of pixels is completed (a rising edge of the third clock signal), the pre-charge of the second row of pixels is completed, and the charging process starts, so as to improve the charging effect, and the charging time is still equal to the cycle of a clock signal. The output of the second driving signal to the $(N+1)^{th}$ row scan line is stopped at a rising edge of the fourth clock signal.

FIG. 4 shows that the time for turning on each active switch last for the cycle of two clock signals, and the time difference of the angle cutting of the first driving signal and second driving signal is equal to the cycle of a clock signal, and the angle cutting voltage of the first driving signal is outputted at a rising edge of a clock signal which shows up at the final time stage of turning on the active switch of the $N^{th}$ row of pixels. In other words, the gate starting voltage of the active switch has an angle cutting when the charge is completed and the active switch is turned off, so as to reduce the capacitive coupling effect, and the first driving signal has no angle cutting at the time other than the time of turning on the active switch. Before and after the pre-charge is completed, the active switch is conducted completely without affecting the target potential charging result. Similarly, the charging result of the $(N+1)^{th}$ row of pixels is the same.

The same process may be applied to pre-charge and charge other remaining pixels until the scan is completed.

Figure 5:
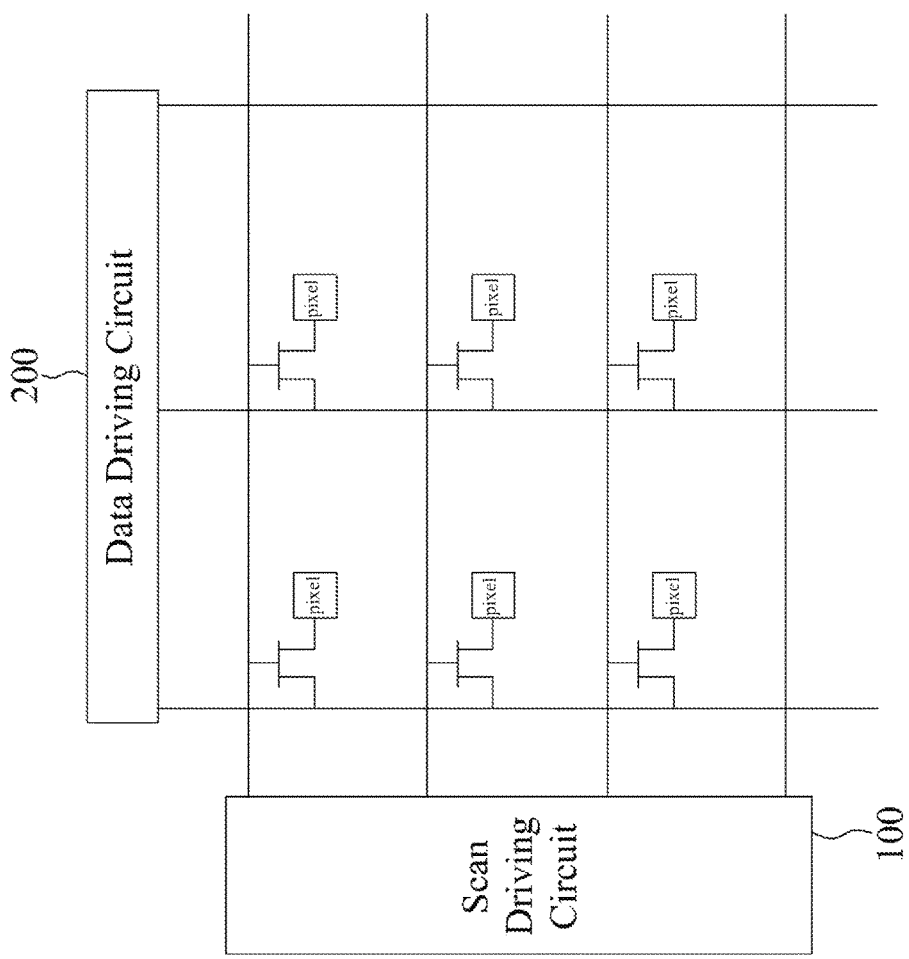
FIG. 5 is a schematic view of a pixel driving circuit in accordance with a preferred embodiment of the present invention.

With reference to FIG. 5, which is a schematic view of a pixel driving circuit in accordance with a preferred embodiment of the present invention, the pixel driving circuit is applicable in a thin film transistor-liquid crystal display (TFT LCD) device.

The pixel charging circuit comprises the following components:

A scan driving circuit 100 is coupled to a plurality of horizontal scan lines for outputting a first driving signal to turn on an active switch of the $N^{th}$ row scan line, and outputting a second driving signal to turn on a switch of the $(N+1)^{th}$ row scan line.

A data driving circuit 200 is coupled to a plurality of vertical data lines for pre-charging and charging the $N^{th}$ row of pixels when outputting the first driving signal, and pre-charging and charging the $(N+1)^{th}$ row of pixels when outputting the second driving signal.

Wherein, the first driving signal has no angle cutting in a predetermined first time period, and the predetermined first time period includes a period of time before and after the pre-charge of the $N^{th}$ row of pixels is completed, and the first driving signal has an angle cutting in a predetermined second time period, and the predetermined second time period includes a period of time before the charge of the $N^{th}$ row of pixels is completed, and N is a natural number.

The second driving signal has no angle cutting in a predetermined third time period, and the predetermined third time period includes a period of time before and after the pre-charge of the $(N+1)^{th}$ row of pixels is completed, and the second driving signal has an angle cutting in a predetermined fourth time period, and the predetermined fourth time period includes a period of time before the charge of the $(N+1)^{th}$ row of pixels is completed, and the difference between the time point of completing the charge of the $N^{th}$ row of pixels and the time point of outputting the second driving signal is positive and equal to or smaller than the pre-charging time of the $(N+1)^{th}$ row of pixels.

In a preferred embodiment of the present invention, a driving signal for driving two adjacent scan lines is not the same signal, and the scan driving circuit 100 outputs a first driving signal to turn on an active switch of the $N^{th}$ row scan line and outputs a second driving signal to turn on an active switch of the second row scan line before the charge of the $N^{th}$ row of pixels ends, so that the data driving circuit 200 can pre-charge the $(N+1)^{th}$ row of pixels when the $N^{th}$ row of pixels are charged.

Charging a row of pixels while pre-charging the next row of pixels can overcome the insufficient charging problem caused by too-high a scan frequency. After the pre-charge ends, the charge of the pixels starts immediately. Since the second driving signal has no angle cutting when the active switch is turned on within a period of time before and after the pre-charging is completed, and the voltage level is high, so that the active switch is maintained at a completely conducted status, and the effect of charging the pixels can be improved since the actual charging effect will not be affected by the poor conduction of the active switch.

In a preferred embodiment, the active switch is a thin film transistor (TFT).

In a preferred embodiment, the predetermined first time period is equal to the predetermined third time period, and the predetermined second time period is equal to the predetermined fourth time period, and the time period before completing the pre-charge of the pixels is equal to half of the pre-charging time, and the period of time after completing the pre-charge of the pixels is equal to half of the pre-charging time.

The first driving signal and second driving signal has an angle cutting when they are outputted in the same time period. In other words, the outputted first driving signal and second driving signal have the same or similar waveform, so that the respective active switches have the same conduction condition when two adjacent rows of pixels are pre-charged or charged, so as to avoid non-uniform charge caused by the different conduction conditions and prevent the non-uniform charge.

The pixel charging circuit further comprises a clock signal generation circuit for generating a plurality of clock signals, and the clock signals are inputted into the scan driving circuit 100 sequentially to control the output of the first driving signal and second driving signal. In the meantime, the clock control signal is related to the time for the data driving circuit 200 to output the data signal.

In a preferred embodiment of the present invention, the first driving signal and second driving signal are different, and the first driving signal and second driving signal outputted from the scan driving circuit 100 can be generated by an generated by an embedded power IC or inputted to the scan driving circuit 100 after the signals are generated by an independent power IC, and then the scan driving circuit 100 drives a start signal and other control signals according to the clock signal to output the first driving signal and second driving signal to two adjacent row scan lines sequentially, and the clock signal controls the output time duration for outputting the first driving signal and second driving signal to the corresponding scan line.

In a preferred embodiment, the difference between the time point of completing the charge of the $N^{th}$ row of pixels and the time point of outputting the second driving signal is equal to the pre-charging time of the $(N+1)^{th}$ row of pixels. In other words, when the charge of a row of pixels is completed, the pre-charge of the next row of pixels is also completed. When the charge of a row of pixels ends, the charge of the next row of pixels starts immediately. Since the pre-charge increases the voltage of the next row of pixel up to a target voltage, the difference between the original voltage and the target voltage is reduced, and the issue of insufficient charge can be improved significantly.

In a preferred embodiment, the pre-charging time is equal to the charging time. When the charge of a row of pixels starts, the next row of pixels is pre-charged. The pre-charging and charging process of the pixels is substantially the same as the above preferred embodiment as shown in FIG. 3:

The scan driving circuit 100 outputs a first driving signal to turn on an active switch of the $N^{th}$ row scan line at a rising edge of the $M^{th}$ clock signal and starts outputting the first driving signal at a rising edge of the $(M+2)^{th}$ clock signal, wherein M is a natural number, and generally M=N.

The data driving circuit 200 pre-charges the $N^{th}$ row of pixels at a rising edge of the $M^{th}$ clock signal and charges the $N^{th}$ row of pixels at a rising edge of the $(M+1)^{th}$ clock signal, wherein the cycle of a clock signal is equal to the pre-charging time, and M is a natural number.

The scan driving circuit 100 outputs a second driving signal to turn on an active switch of the $(N+1)^{th}$ row scan line at a rising edge of the $(M+1)^{th}$ clock, and stops outputting the second driving signal at a rising edge of the $(M+3)^{th}$ clock.

The data driving circuit 200 pre-charges the $(N+1)^{th}$ row of pixels at a rising edge of the $(M+1)^{th}$ clock and charges the $(N+1)^{th}$ row of pixels at a rising edge of the $(M+2)^{th}$ clock signal.

The pixel charging circuit pre-charges and charges the remaining pixels sequentially according to the aforementioned process, until the scan is completed.

The time of turning on each active switch lasts for two cycles of the clock signal, and the angle cutting time difference of the first driving signal and second driving signal is equal to one cycle of a clock signal, and the angle cutting voltage of the first driving signal is outputted at a rising edge of a clock signal which shows up at the final time stage of turning on the active switch of the $N^{th}$ row of pixels. In other words, the gate starting voltage of the active switch has an angle cutting when the charge is completed and the active switch is turned off, so as to reduce the capacitive coupling effect, and the first driving signal has no angle cutting at times other than the time of turning on the active switch. Before and after the pre-charge is completed, the active switch is conducted completely without affecting the target potential charging result In a preferred embodiment, if the first level signal and second level signal have insufficient driving capacity, it will be necessary to amplify the first level signal and second level signal to enhance their drive capacity before the scan circuit is driven to output the signals to the scan line.

Figure 6:
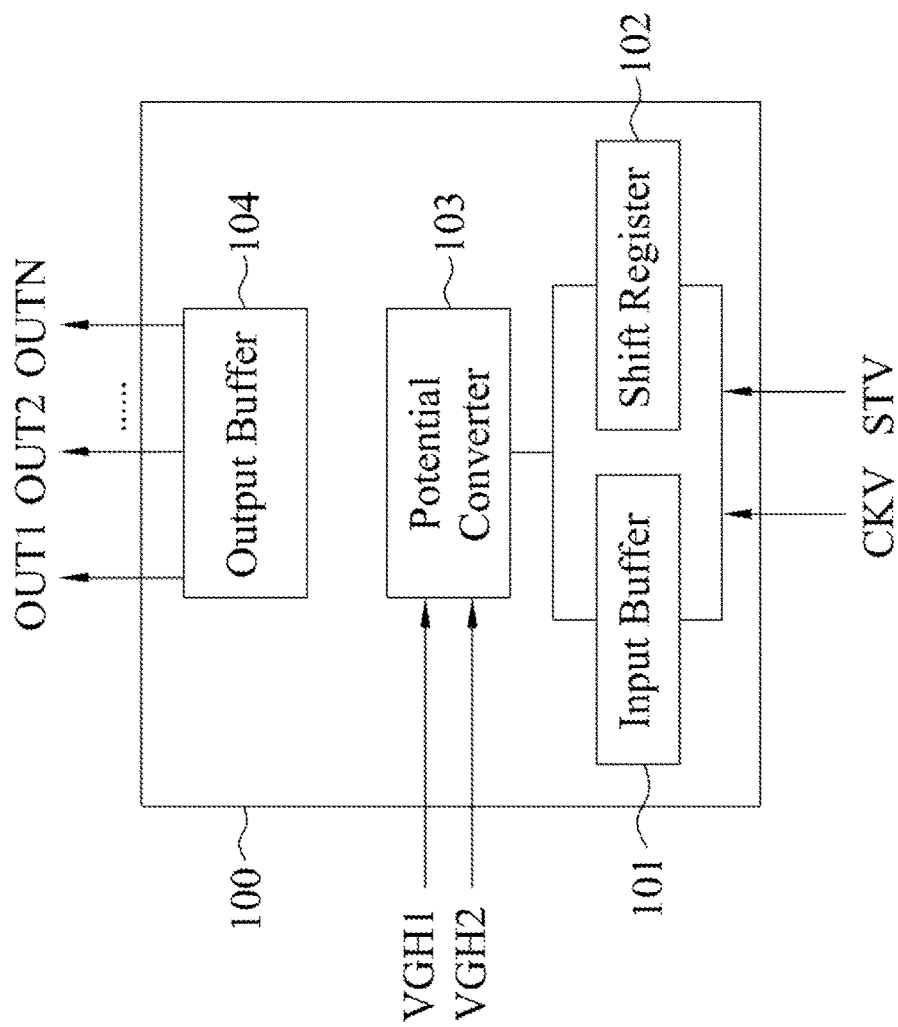
FIG. 6 is a schematic view of a scan driving circuit in accordance with a preferred embodiment of the present invention.

In FIG. 6, the scan driving circuit 100 comprises an input buffer 101, a shift register 102, a potential converter 103 and an output buffer 104. The input buffer 101 processes the inputted control signal to enhance the drive capacity, so that the first drive capacity and second drive capacity inputted into the scan driving circuit 100 can be processed correctly, and the shift register 102 is provided to open signal output channels of the scan driving circuit 100 according to the clock signal row by row, so that the scan driving signal outputs signals to the scan lines one by one, and the first driving signal or second driving signal inputted from a power IC outside a level converter is amplified to a high level voltage, and a high level signal or low level signal for driving the scan line is outputted according to the clock signal and a drive starting signal to turn on or off an active switch connected to the scan line, and the output buffer 104 amplifies the signal outputted from the high level converter to enhance the drive capacity of the signal.

Figure 7:
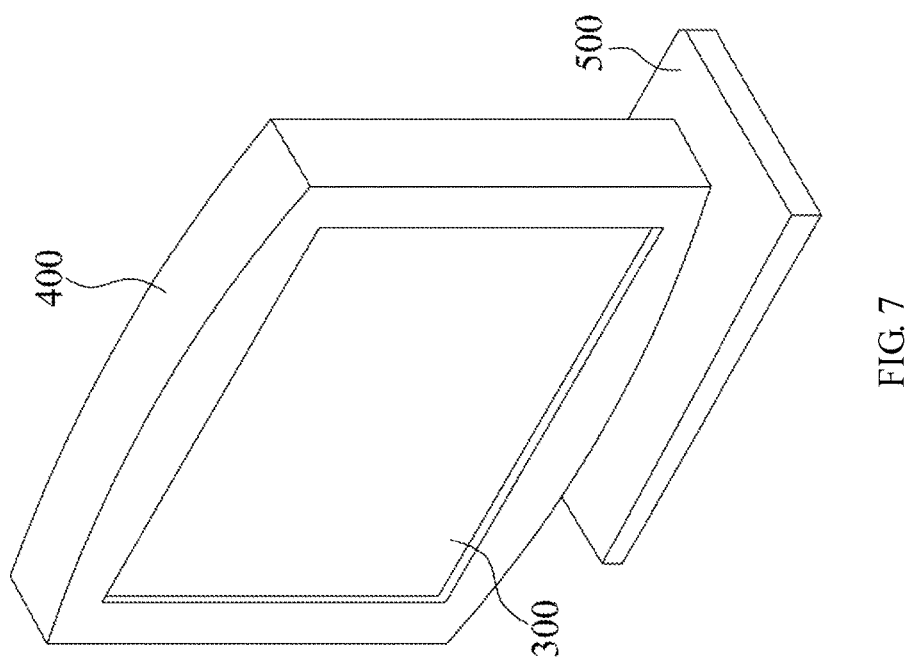
FIG. 7 is a schematic view of an LCD device in accordance with a preferred embodiment of the present invention.

With reference to FIG. 7, which shows an LCD device in accordance with a preferred embodiment of the present invention, the LCD device includes an LCD panel 300 and a housing 400 fixed to the LCD panel, and the LCD panel 300 includes the pixel charging circuit of the foregoing preferred embodiments.

Further, the LCD device includes a base 500 for setting the display device on a flat surface such as a tabletop.

While the invention has been described in terms of what is presently considered to be the most practical and preferred embodiments, it is to be understood that the invention need not be limited to the disclosed embodiment. On the contrary, it is intended that various modifications and similar arrangements are included within the spirit and scope of the appended claims which are to be accorded with the broadest interpretation so as to encompass all such modifications and similar structures.

What is claimed is:

1. A pixel charging method, comprising the steps of: outputting, with reference to a clock signal, a first driving signal to turn on an active switch of an Nth row scan line to pre-charge an $N^{th}$ row of pixels at a rising edge of an $M^{th}$ pulse of the clock signal, and to charge the $N^{th}$ row of pixels at a rising edge of an $(M+1)^{th}$ pulse of the clock signal, wherein the first driving signal has no angle cutting in a predetermined first time period, and the predetermined first time period includes a period of time before and after pre-charging of the $N^{th}$ row of pixels is completed, and the first driving signal has an angle cutting in a predetermined second time period, and the predetermined second time period includes a period of time before charging of the $N^{th}$ row of pixels is completed, and M and N are natural numbers;
   outputting a second driving signal to turn on an active switch of an $(N+1)^{th}$ row scan line to pre-charge the $(N+1)^{th}$ row of pixels at the rising edge of the $(M+1)^{th}$ pulse of the clock signal, and to charge the $(N+1)^{th}$ row of pixels at a rising edge of an $(M+2)^{th}$ pulse of the clock signal;
   wherein the second driving signal has no angle cutting in a predetermined third time period, and the predetermined third time period includes a period of time before and after pre-charging of the $(N+1)^{th}$ row of pixels is completed, and the second driving signal has an angle cutting in a predetermined fourth time period, and the predetermined fourth time period includes a period of time before charging of the $(N+1)^{th}$ row of pixels is completed, and a difference between a time point of completing charging of the $N^{th}$ row of pixels and a time point of outputting the second driving signal is positive and equal to or smaller than a pre-charging time of the $(N+)^{th}$ row of pixels;
   wherein each of the angle cuttings of the first driving signal and the second driving signal occupies half of the cycle of the clock signal, and starts at a following edge of the clock signal and ends at a subsequent rising edge of the clock signal;
   wherein the period of time before completing pre-charging of the $N^{th}$ row of pixels in the predetermined first time period is half of the cycle of the clock signal, and the period of time after completing pre-charging of the $N^{th}$ row of pixels in the predetermined first time period is half of the cycle of the clock signal;
   wherein the period of time before completing pre-charging of the $(N+1)^{th}$ row of pixels in the predetermined third time period is half of the cycle of the clock signal, and the period of time after completing pre-charging of the $(N+1)^{th}$ row of pixels in the predetermined third time period is half of the cycle of the clock signal.

2. The method of claim 1, wherein the difference between the time point of completing charging of the $N^{th}$ row of pixels and the time point of outputting the second driving signal is equal to the pre-charging time of the $(N+1)^{th}$ row of pixels.

3. The method of claim 1, wherein the predetermined first time period is equal to the predetermined third time period, and the predetermined second time period is equal to the predetermined fourth time period.

4. A pixel charging circuit, comprising:
   a scan driving circuit, with reference to a clock signal, outputting a first driving signal to turn on an active switch of an $N^{th}$ row scan line, and outputting a second driving signal to turn on an active switch of an $(N+1)^{th}$ row scan line;
   a data driving circuit, pre-charging an $N^{th}$ row of pixels at a rising edge of an $M^{th}$ pulse of the clock signal and charging the $N^{th}$ row of pixels at a rising edge of an $(M+1)^{th}$ pulse of the clock signal according to the first driving signal, and pre-charging an $(N+1)^{th}$ row of pixels at the rising edge of the $(M+1)^{th}$ pulse of the clock signal, and charging the $(N+1)^{th}$ row of pixels at a rising edge of an $(M+2)^{th}$ pulse of the clock signal according to the second driving signal;

wherein the first driving signal has no angle cutting in a predetermined first time period, and the predetermined first time period includes a period of time before and after pre-charging of the $N^{th}$ row of pixels is completed, and the first driving signal has an angle cutting in a predetermined second time period, and the predetermined second time period includes a period of time before charging of the $N^{th}$ row of pixels is completed, and M and N are natural numbers;

wherein the second driving signal has no angle cutting in a predetermined third time period, and the predetermined third time period includes a period of time before and after pre-charging of the $(N+1)^{th}$ row of pixels is completed, and the second driving signal has an angle cutting in a predetermined fourth time period, and the predetermined fourth time period includes a period of time before charging of the $(N+1)^{th}$ row of pixels is completed, and a difference between a time point of completing charging of the $N^{th}$ row of pixels and a time point of outputting the second driving signal is positive and equal to or smaller than a pre-charging time of the $(N+)^{th}$ row of pixels;

wherein each of the angle cuttings of the first driving signal and the second driving signal occupies half of the cycle of the clock signal, and starts at a following edge of the clock signal and ends at a subsequent rising edge of the clock signal;

wherein the period of time before completing pre-charging of the $N^{th}$ row of pixels in the predetermined first time period is half of the cycle of the clock signal, and the period of time after completing pre-charging of the $N^{th}$ row of pixels in the predetermined first time period is half of the cycle of the clock signal;

wherein the period of time before completing pre-charging of the $(N+1)^{th}$ row of pixels in the predetermined third time period is half of the cycle of the clock signal, and the period of time after completing pre-charging of the $(N+1)^{th}$ row of pixels in the predetermined third time period is half of the cycle of the clock signal.

5. The pixel charging circuit of claim 4, wherein the difference between the time point of completing charging of the $N^{th}$ row of pixels and the time point of outputting the second driving signal is equal to the pre-charging time of the $(N+1)^{th}$ row of pixels.

6. The pixel charging circuit of claim 5, wherein the predetermined first time period is equal to the predetermined third time period, and the predetermined second time period is equal to the predetermined fourth time period.

7. The pixel charging circuit of claim 4, wherein the scan driving circuit stops outputting the second driving signal at a rising edge of an $(M+3)^{th}$ pulse of the clock signal.

8. An LCD panel, comprising a pixel charging circuit, wherein the pixel charging circuit comprises:
a scan driving circuit, with reference to a clock signal, outputting a first driving signal to turn on an active switch of an $N^{th}$ row scan line, and outputting a second driving signal to turn on an active switch of an $(N+1)^{th}$ row scan line;
a data driving circuit, pre-charging an $N^{th}$ row of pixels at a rising edge of an $M^{th}$ pulse of the clock signal and charging the $N^{th}$ row of pixels at a rising edge of an $(M+1)^{th}$ pulse of the clock signal according to the first driving signal, and pre-charging an $(N+1)^{th}$ row of pixels at the rising edge of the $(M+1)^{th}$ pulse of the clock signal, and charging the $(N+1)^{th}$ row of pixels at a rising edge of an $(M+2)^{th}$ pulse of the clock signal according to the second driving signal;

wherein the first driving signal has no angle cutting in a predetermined first time period, and the predetermined first time period includes a period of time before and after pre-charging of an $N^{th}$ row of pixels is completed, and the first driving signal has an angle cutting in a predetermined second time period, and the predetermined second time period includes a period of time before completing the charge of the $N^{th}$ row of pixels, and M and N are natural numbers;

wherein the second driving signal has no angle cutting in a predetermined third time period, and the predetermined third time period includes a period of time before and after pre-charging of the $(N+1)^{th}$ row of pixels is completed, and the second driving signal has an angle of cutting in a predetermined fourth time period, and the predetermined fourth time period includes a period of time before charging of the $(N+1)^{th}$ row of pixels is completed, and a difference between a time point of completing charging of the $N^{th}$ row of pixels and a time point of outputting the second driving signal is positive and equal to or smaller than a pre-charging time of the $(N+1)^{th}$ row of pixels;

wherein each of the angle cuttings of the first driving signal and the second driving signal occupies half of the cycle of the clock signal, and starts at a following edge of the clock signal and ends at a subsequent rising edge of the clock signal;

wherein the period of time before completing pre-charging of the $N^{th}$ row of pixels in the predetermined first time period is half of the cycle of the clock signal, and the period of time after completing pre-charging of the $N^{th}$ row of pixels in the predetermined first time period is half of the cycle of the clock signal;

wherein the period of time before completing pre-charging of the $(N+1)^{th}$ row of pixels in the predetermined third time period is half of the cycle of the clock signal, and the period of time after completing pre-charging of the $(N+1)^{th}$ row of pixels in the predetermined third time period is half of the cycle of the clock signal.

9. The LCD panel of claim 8, wherein the difference between the time point of completing charging of the $N^{th}$ row of pixels and the time point of outputting the second driving signal is equal to the pre-charging time of the $(N+1)^{th}$ row of pixels.

10. The LCD panel of claim 9, wherein the predetermined first time period is equal to the predetermined third time period, and the predetermined second time period is equal to the predetermined fourth time period.

11. The LCD panel of claim 10, wherein the scan driving circuit stops outputting the first driving signal at a rising edge of an $(M+2)^{th}$ pulse of the clock signal.

12. The LCD panel of claim 11, wherein the scan driving circuit stops outputting the second driving signal at a rising edge of an $(M+3)^{th}$ pulse of the clock signal.

13. An LCD device, comprising an LCD panel, wherein the LCD panel comprises a pixel charging circuit, and the pixel charging circuit comprises:
a scan driving circuit, with reference to a clock signal, outputting a first driving signal to turn on an active switch of an $N^{th}$ row scan line, and outputting a second driving signal to turn on an active switch of an $(N+1)^{th}$ row scan line;
a data driving circuit, pre-charging an $N^{th}$ row of pixels at a rising edge of an $M^{th}$ pulse of the clock signal and charging the $N^{th}$ row of pixels at a rising edge of an $(M+1)^{th}$ pulse of the clock signal according to the first driving signal, and pre-charging an $(N+1)^{th}$ row of pixels at the rising edge of the $(M+1)^{th}$ pulse of the clock signal, and charging the $(N+1)^{th}$ row of pixels at a rising edge of an $(M+2)^{th}$ pulse of the clock signal according to the second driving signal;

wherein the first driving signal has no angle cutting in a predetermined first time period, and the predetermined first time period includes a period of time before and after pre-charging of the $N^{th}$ row of pixels is completed, and the first driving signal has an angle cutting in a predetermined second time period, and the predetermined second time period includes a period of time before and after charging of the $N^{th}$ row of pixels is completed, and M and N are natural numbers;

wherein the second driving signal has no angle cutting in a predetermined third time period, and the predetermined third time period includes a period of time before and after pre-charging of the $(N+1)^{th}$ row of pixels is completed, and the second driving signal has an angle cutting in a predetermined fourth time period, and the predetermined fourth time period includes a period of time before pre-charging of the $(N+1)^{th}$ row of pixels is completed, and the difference between a time point of completing charging of the $N^{th}$ row of pixels and a time point of outputting the second driving signal is positive and equal to or smaller than a pre-charging time of the $(N+1)^{th}$ row of pixels;

wherein each of the angle cuttings of the first driving signal and the second driving signal occupies half of the cycle of the clock signal, and starts at a following edge of the clock signal and ends at a subsequent rising edge of the clock signal;

wherein the period of time before completing pre-charging of the $N^{th}$ row of pixels in the predetermined first time period is half of the cycle of the clock signal, and the period of time after completing pre-charging of the $N^{th}$ row of pixels in the predetermined first time period is half of the cycle of the clock signal;

wherein the period of time before completing pre-charging of the $(N+1)^{th}$ row of pixels in the predetermined third time period is half of the cycle of the clock signal, and the period of time after completing pre-charging of the $(N+1)^{th}$ row of pixels in the predetermined third time period is half of the cycle of the clock signal.

14. The LCD device of claim 13, wherein the difference between the time point of completing charging of the $N^{th}$ row of pixels and the time point of outputting the second driving signal is equal to the pre-charging time of the $(N+1)^{th}$ row of pixels.

15. The LCD device of claim 14, wherein the predetermined first time period is equal to the predetermined third time period, and the predetermined second time period is equal to the predetermined fourth time period.

16. The LCD panel of claim 15, wherein the scan driving circuit stops outputting the first driving signal at a rising edge of an $(M+2)^{th}$ pulse of the clock signal.

17. The LCD panel of claim 16, wherein the scan driving circuit stops outputting the second driving signal at a rising edge of an $(M+3)^{th}$ pulse of the clock signal.

* * * * *